(No Model.)

H. S. & T. H. GREENE.
CLOTH NAPPING MACHINE.

No. 522,560.

Patented July 3, 1894.

Fig. 1.

WITNESSES:
INVENTORS (No Model.) 9 Sheets—Sheet 2.

H. S. & T. H. GREENE.
CLOTH NAPPING MACHINE.

No. 522,560. Patented July 3, 1894.

WITNESSES: INVENTORS:

(No Model.) 9 Sheets—Sheet 3.

H. S. & T. H. GREENE.
CLOTH NAPPING MACHINE.

No. 522,560. Patented July 3, 1894.

Fig. 3.

WITNESSES: INVENTORS (No Model.) 9 Sheets—Sheet 4.
H. S. & T. H. GREENE.
CLOTH NAPPING MACHINE.

No. 522,560. Patented July 3, 1894.

WITNESSES:
INVENTORS (No Model.)

H. S. & T. H. GREENE.
CLOTH NAPPING MACHINE.

No. 522,560.   Patented July 3, 1894.

WITNESSES
F. M. Whipple
H. S. McLeod

INVENTORS
H. S. Greene
T. H. Greene
by
Wright, Brown & Hensley
Attys.

(No Model.)

H. S. & T. H. GREENE.
CLOTH NAPPING MACHINE.

No. 522,560.

Patented July 3, 1894.

WITNESSES:

INVENTORS:

(No Model.) 9 Sheets—Sheet 7.
H. S. & T. H. GREENE.
CLOTH NAPPING MACHINE.

No. 522,560. Patented July 3, 1894.

WITNESSES.
F. M. Whipple
W. S. McLood.

INVENTORS:
H. S. Greene,
T. H. Greene,
by Mighr. Brown & Crossley,
Attys.

THE NORRIS PETERS CO., PHOTO-LITHO., WASHINGTON, D. C.

UNITED STATES PATENT OFFICE.

HENRY S. GREENE, OF LAWRENCE, AND THOMAS H. GREENE, OF LOWELL, MASSACHUSETTS.

CLOTH-NAPPING MACHINE.

SPECIFICATION forming part of Letters Patent No. 522,560, dated July 3, 1894.

Application filed December 2, 1892. Serial No. 453,899. (No model.)

*To all whom it may concern:*

Be it known that we, HENRY S. GREENE, of Lawrence, in the county of Essex, and THOMAS H. GREENE, of Lowell, in the county of Middlesex, State of Massachusetts, have invented certain new and useful Improvements in Cloth-Napping Machines, of which the following is a specification.

This invention has relation to that class of napping or teaseling machines in which the villous or nap surface is produced upon cloth by means of card-clothed rollers running in contact with the cloth, and particularly to the kind of machines mentioned in which a plurality of napping rollers are constructed and arranged to rotate on their own axes in bearings connected with a drum or drum-head and at the same time to be revolved around the said drum, the rollers in their movements being brought into contact with the surface of the cloth, as the latter passes through the machine.

It is the object of the invention to provide means whereby the guide rollers for the cloth may be adjusted with the greatest readiness and with the utmost nicety with respect to the napping rolls so as to cause the latter to act upon the cloth with greater or less vigor and efficacy, as circumstances may suggest.

It is also the object of the invention to provide means whereby the cloth under treatment may be frictionally drawn through the machine and maintained in taut condition at all points at which it is acted upon.

It is also the object of the invention to provide means whereby the movement of the cloth through the machine may be stopped instantly without arresting or affecting the operation of other portions of the machine than those which accomplish the movement of the cloth.

It is also the object of the invention to provide means simple in construction and arrangement for the efficient operation of the napping rollers.

It is also the object of the invention to provide other means in the organization of the machine of greater or less importance, having relation to the foregoing.

To these ends the invention consists in improved parts and groups of parts, and in the machine as a whole, all as I will now proceed to describe and claim.

Reference is to be had to the annexed drawings, and to the letters and figures marked thereon, forming a part of this specification, the same letters and figures designating the same parts or features, wherever they occur.

Of the said drawings Fig. 2 is a left-hand end view of the same. Fig. 2ª is a sectional detail view showing the manner of frictionally connecting the roll-driving gears with their shafts. Fig. 7 is a detail view taken from the rear of the machine, showing the manner of adjusting the guide rolls for the cloth with respect to the nap-laying roll, and for adjusting the clearing roll with reference to the nap-laying roll. Fig. 8 is a sectional view taken on the line 8 8, (Fig. 7,) looking toward the left. Figs. 9 and 10 are detail views hereinafter more particularly referred to.

In the drawings $a$ designates the frame of the machine which may be of the form represented or of any other suited to the purpose. $c$ is the main shaft from which all of the moving parts of the machine are operated.

Figure 6:
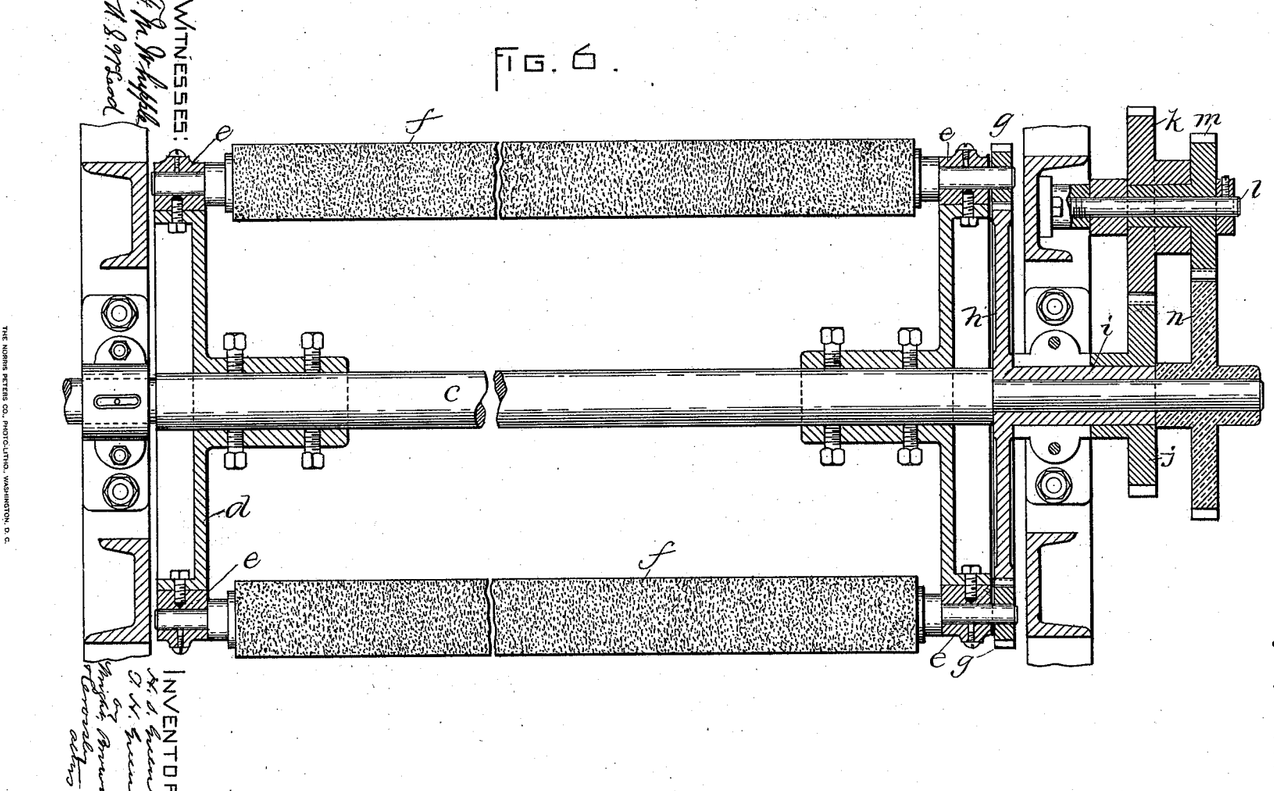
Fig. 6 is a longitudinal sectional view, showing two napping rolls and their adjuncts, and the relationship of, and manner of operating several parts.
Figures 7, 9:
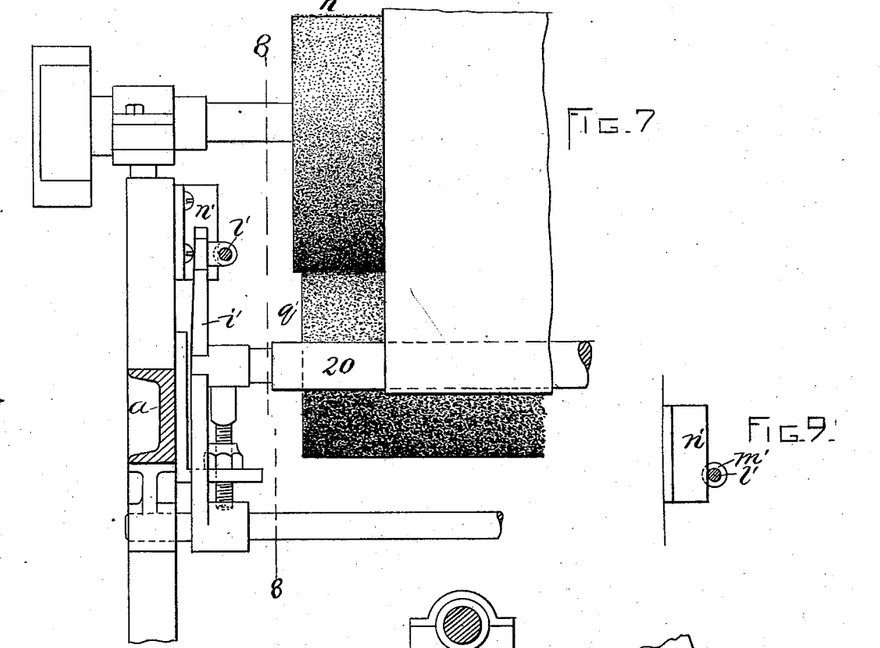

$d$ (see Fig. 6) is a cylinder or drum head connected with the main shaft, provided on its periphery with bearings $e$ for the journals of the napping rollers $f$, the said journals, on the right-hand end of the machine being provided with pinions $g$ which are engaged by the teeth of a gear wheel $h$, turning loose on the shaft $c$. The said gear wheel $h$ is provided with a sleeve $i$, upon which is secured a gear wheel $j$ engaged by a gear $k$ on an independent shaft $l$; and compounded with the gear $k$ is a gear $m$ which is engaged and driven by a gear $n$ secured to the main shaft $c$.

Figure 1:
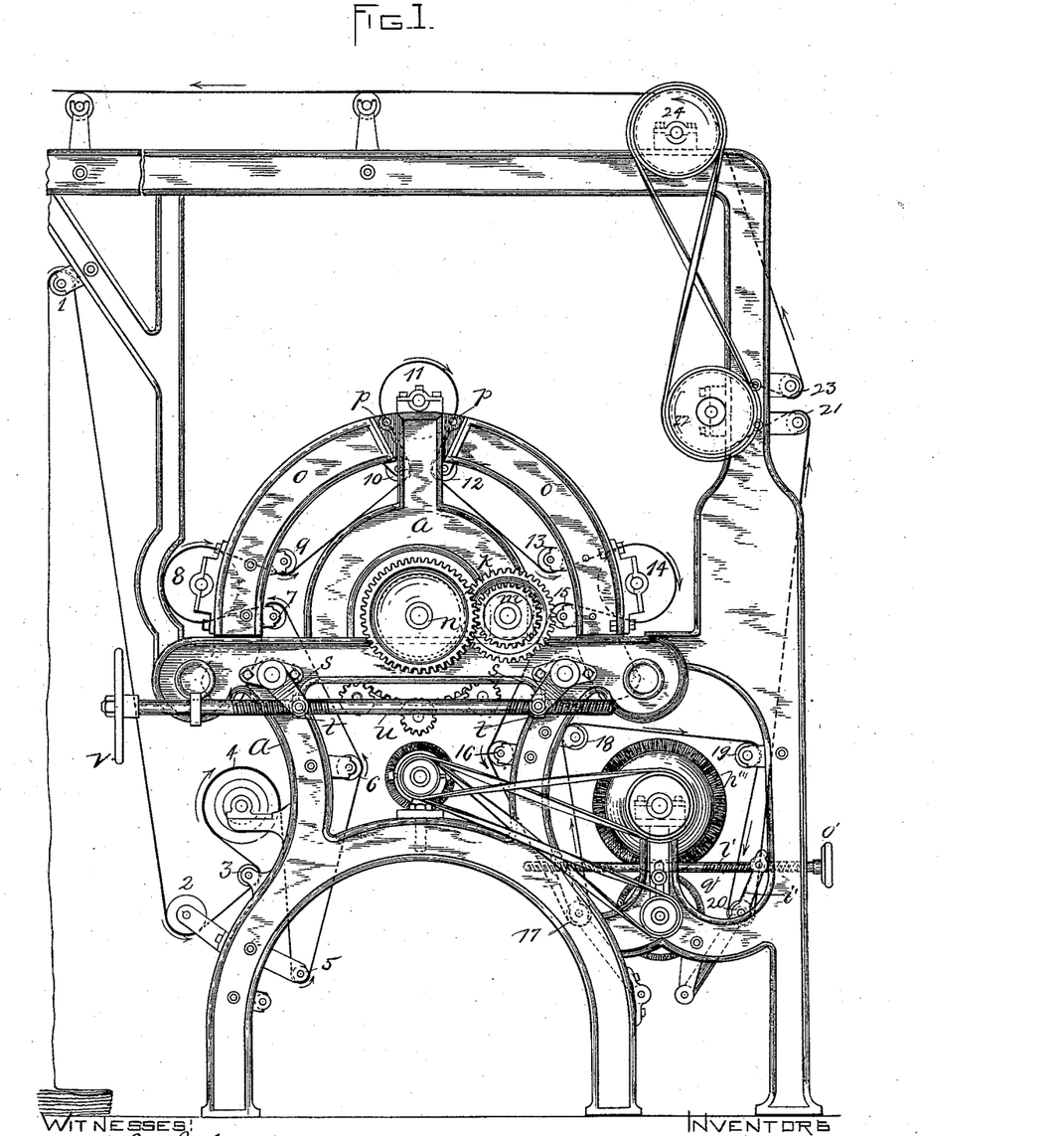
—Figure 1 is what may be termed a "right-hand end view" of the machine embodying the invention.
Figures 2, 2A:
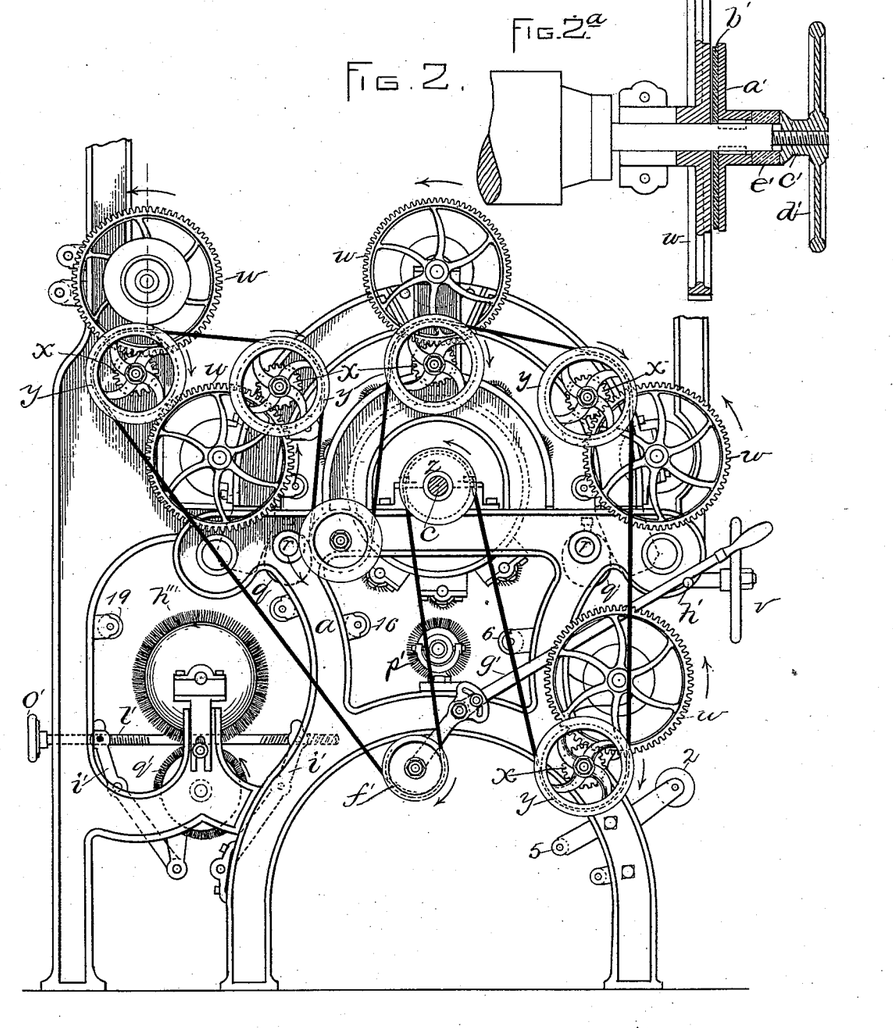

The main shaft, cylinder, and gear $n$ will be driven in the direction of the arrow shown in proximity to the main shaft in Fig. 2, and as the gear $n$ is larger than the gear $m$, the napping rollers $f$ will be rotated upon their axes in the same direction through the gears $h$ and $m$ and their intermediaries. This system of gearing is shown only for the purpose of illustrating a kind of means that may be employed for operating the machine, but said means *per se* forms no part of my present invention.

It will be understood, of course, that the napping rollers are covered with card clothing of a nature to adapt them to raise or teasel a nap upon the surface of the cloth with which they come in contact.

The cloth, in its course through the machine passes up over a guide roller 1, down under a guide roller 2, inward around a guide roller 3, up over a cloth-covered frictionally driven roll 4, down under a guide roller 5, up against a guide roller 6, up around a guide roller 7, back around a cloth-covered frictionally driven roll 8, inward under a guide roller 9, upward around a guide roller 10, up and down around a cloth-covered frictionally driven roll 11, down under a guide roller 12, downward and rearward under a guide roller 13, rearward and forward around a cloth-covered frictionally driven roll 14, inward around a guide roller 15, downward against a guide roller 16, down under a guide roller 17, up around guide rollers 18 and 19, down under a guide roller 20, up over a guide roller 21, inward and outward around a cloth-covered frictionally driven roll 22, outward around a guide roller 23, up over a frictionally driven roll 24, and forward over suitable guide rollers to the point of starting.

The frictionally driven rolls 4, 8, 11, 14, 22, and 24 serve to draw the cloth through the machine, and may be of increased diameter successively from the first to the last-mentioned so as to keep the cloth under treatment properly stretched or under the desired tension where it is acted upon by the napping rolls.

The frictionally driven rolls 8 and 14 which are arranged on opposite sides of the cylinder, have their bearings connected with the arch $o$, which is divided centrally, and hinged at its divided point as at $p$ to the frame $a$. The journals of the guide rollers 7, 9 co-operating with the roll 8, and the guide rollers 13, 15 co-operating with the roll 14, are also arranged in bearings supported by the arch $o$. The lower ends of the arches $o$ are arranged to rest upon cams $q$ secured upon shafts $r$, journaled in the frame, on the ends of which shafts are cranks $s$ in the lower or outer ends of which are pivoted or swiveled nuts $t$ through which the screw-threaded portions of a rod $u$ pass, said rod $u$ being arranged so as that it may be turned in its bearings but not to move longitudinally. The rod $u$ may also be provided with a hand-wheel $v$ or other means whereby it may be turned, and so operate the shafts $r$, cams $q$ and arches $o$ to adjust the rolls 8 and 14 and their co-operating guide rollers nearer to or farther from the cylinder, and consequently nearer to or farther from the napping rollers.

Figure 3:
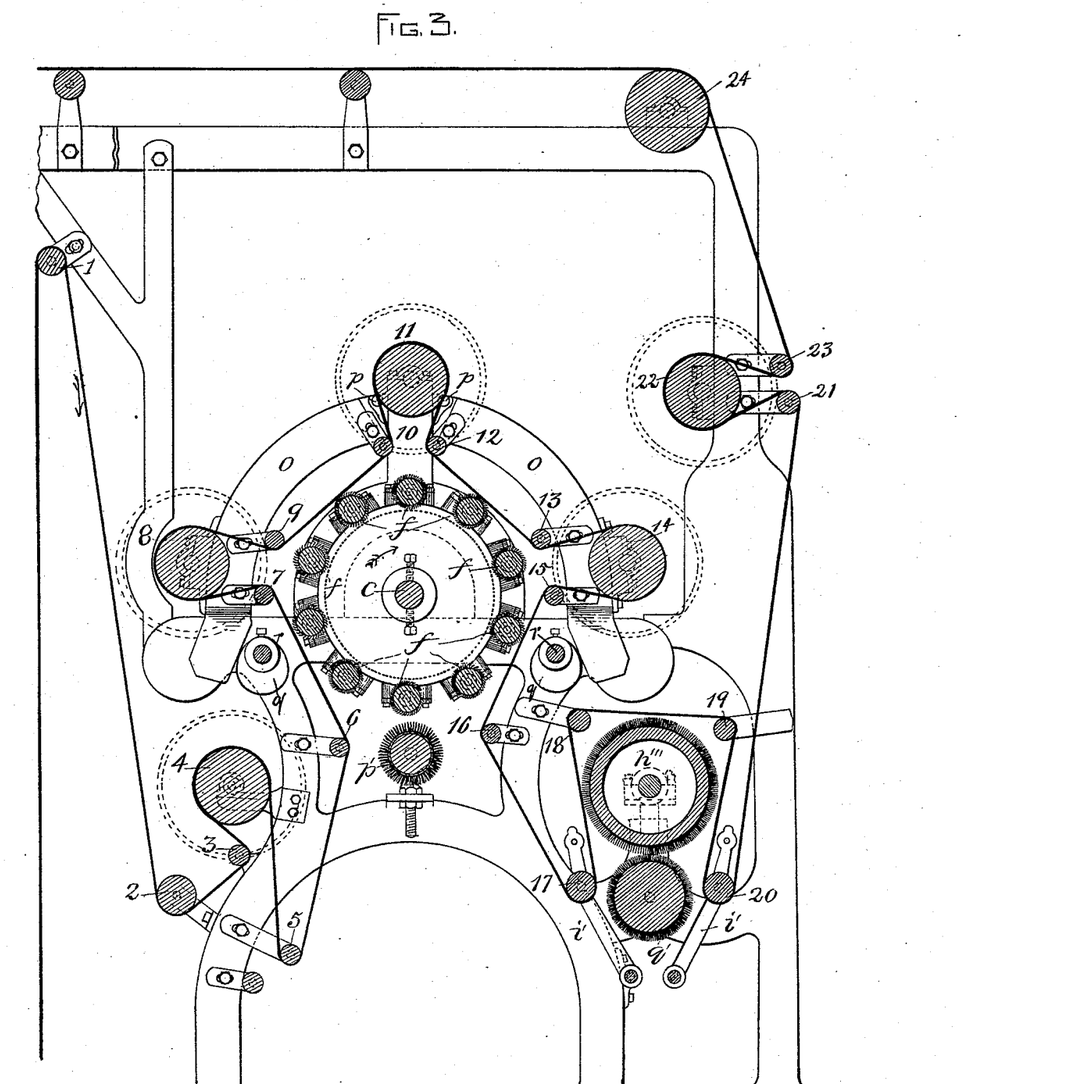
Fig. 3 is a sectional right-hand end view taken on a line running centrally through the machine.
Figure 4:
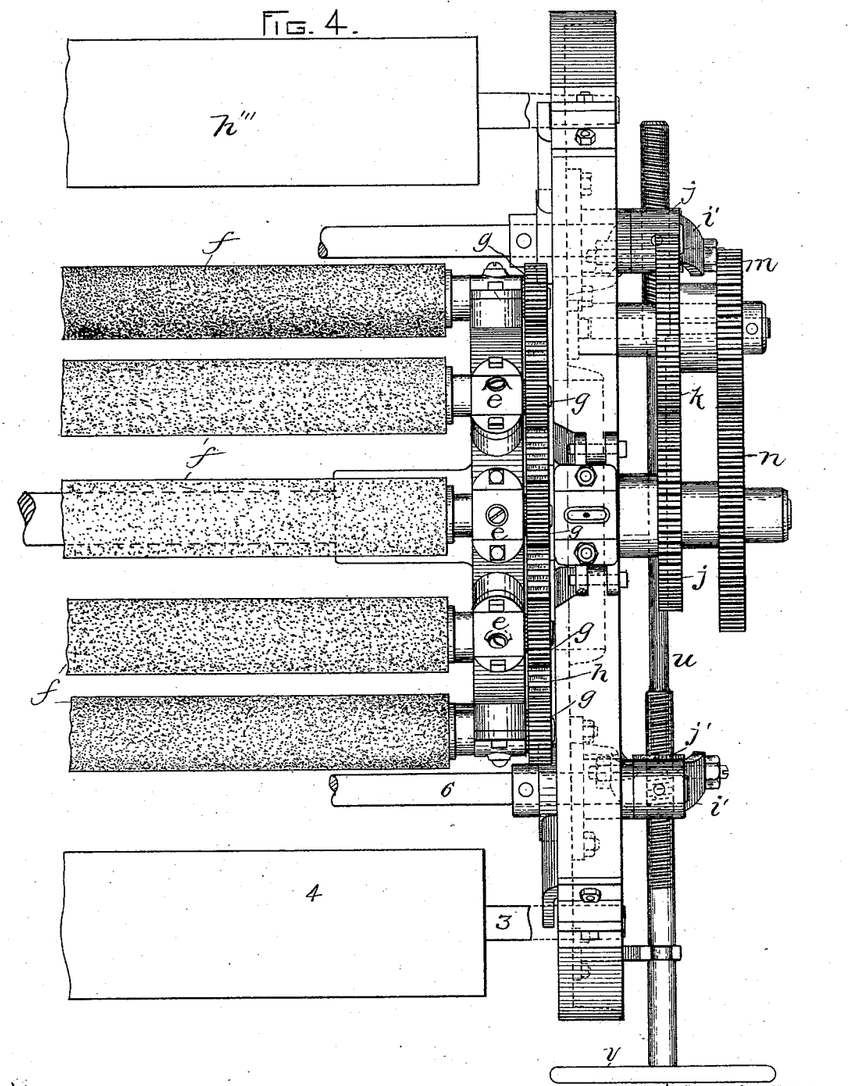
Fig. 4 is a top plan view of a portion of the right-hand end of the machine.
Figure 5:
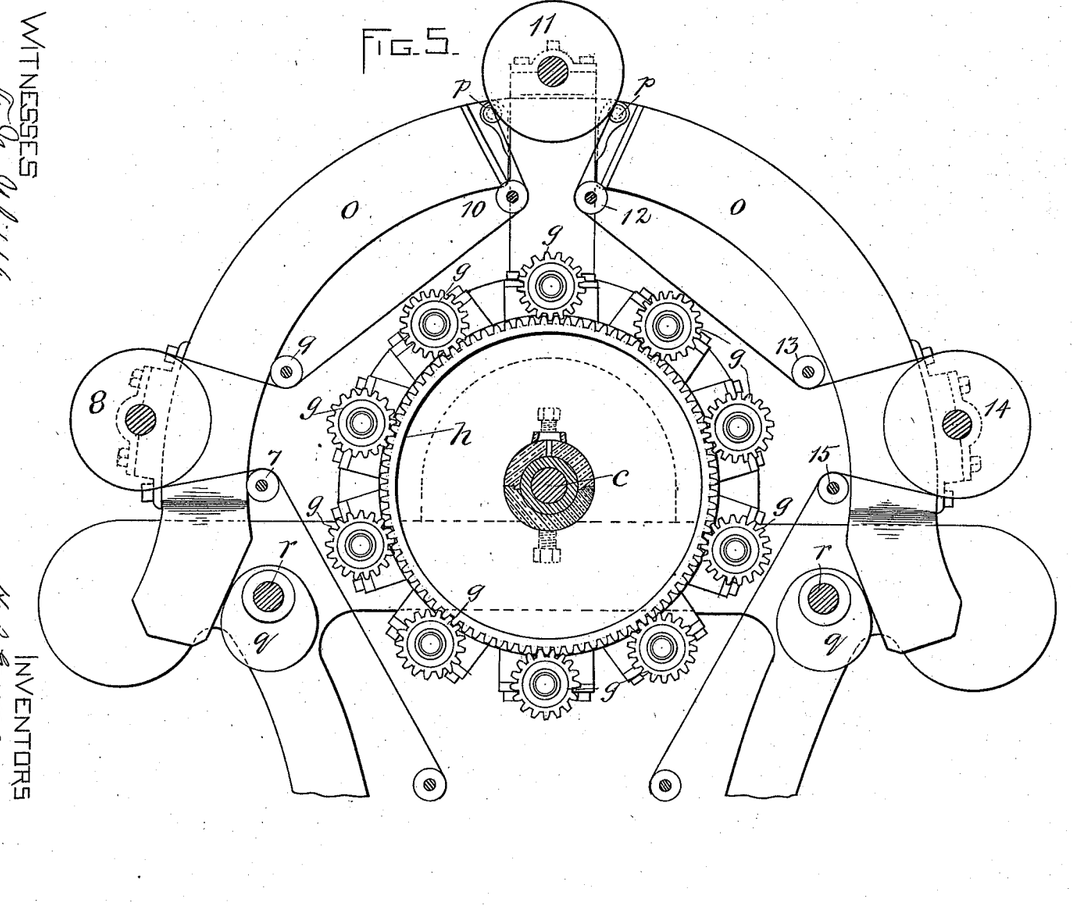
Fig. 5 is a sectional end view showing the immediate means for operating the napping rolls, and illustrating the course of the cloth through the machine where it is acted upon by the napping rolls, the parts being drawn to a larger scale than in Figs. 1, 2 and 3.

It will be seen, particularly upon an inspection of Fig. 3 of the drawings that the cloth will be acted upon by the napping rollers at four points, namely, between the guide rollers 6 and 7, 9 and 10, 12 and 13, and 15 and 16, and that by adjusting the arches through the medium of the screw rod $u$, which adjustment may be readily accomplished and made with the utmost nicety and while the machine is in motion if need be, the cloth may be brought nearer to or removed farther from the napping rolls so that the latter may be made to operate with greater or less vigor or force in raising the nap.

Another matter of great consequence in the feature of the machine just described is that all of the adjustments are effected in unison and are of absolutely the same degree or extent.

Each of the rolls 4, 8, 11, 14 and 22 is driven by a gear $w$ which is engaged by a pinion $x$ compounded with a pulley $y$, a belt passing around all the said pulleys and a pulley $z$ on the main shaft $c$, each pinion $x$ and its pulley $y$ being journaled on a stud secured to the frame. Each gear $w$ is arranged to turn loosely on the shaft of its roll, but is frictionally connected with its shaft by means of a disk $a'$ splined on said shaft and bearing against a friction disk $b'$ which rests against the face of the gear $w$, (see Fig. 2$^a$.) A nut $c'$ provided with a hand-wheel $d'$ is turned upon the screw-threaded end of each roll, and bears against a friction collar $e'$ or other similar means, the latter bearing against the hub of the friction disk $b'$, which means serve to regulate the force with which the gear wheel $w$ is frictionally bound to its shaft, and as a consequence regulates the force with which the drawing rolls 4, 8, 11, 14 and 22 act upon the cloth and the tension under which the latter is put.

$f'$ is a tightening pulley secured to one end of a lever $g'$ pivoted upon the frame of the machine, around which pulley the belt which drives the pulleys $y$ passes, so that by supporting the handle end of the lever $g'$ upon a pin $h'$, as shown in Fig. 2, the belt may be tightened and the drawing rolls operated, as before described, and by throwing the said lever off the said pin the belt will be rendered so slack as to fail to operate the drawing rolls, without affecting the other parts of the machine.

Figures 8, 10:
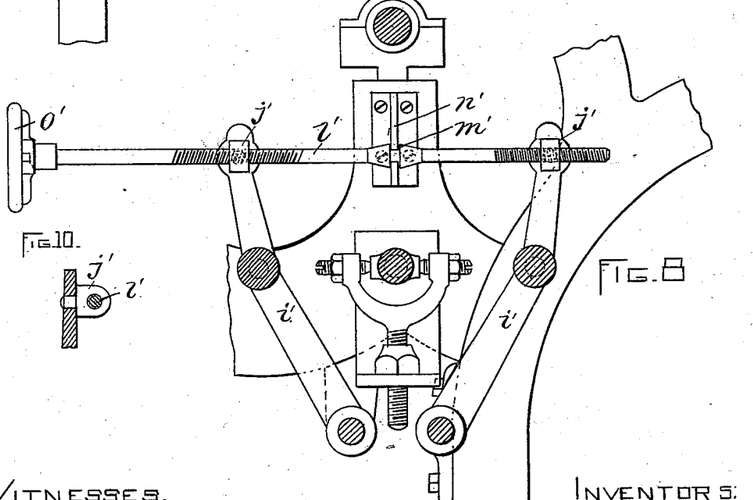

$h''''$ designates the nap finishing or laying roll which operates upon its opposite sides on the cloth, as is best shown in Fig. 3. It will be seen that the guide rollers 17 and 20, below the nap-finishing roll are journaled in swinging arms or levers $i'$, in the upper ends of which are pivoted nuts $j'$ engaged by the screw-threaded portion of a rod $l'$, provided with a groove $m'$ intermediate of its threaded points, in which groove fits a feather or rib $n'$ connected with the frame, so that when the rod $l'$ is turned, as it may be by a hand-wheel $o'$ on its ends it may bring the upper ends of the levers $i'$ closer together or move them farther apart, and so bring the guide rollers 17, 20 nearer to or move them farther from the nap finishing roll to make the latter operate with greater or less energy on the nap. $p'$ is a clearing roll for the napping rolls $f$, and $q'$ is a clearing roll for the nap-finishing roll $h''''$, which clearing-rolls are mounted in adjustable bearings, as shown in Figs. 3 and 8 so as to cause them to act properly on the nap rolls.

The nap-finishing and clearing rolls are driven by suitable belting as shown, or may be operated in any other suitable way.

Figure 11:
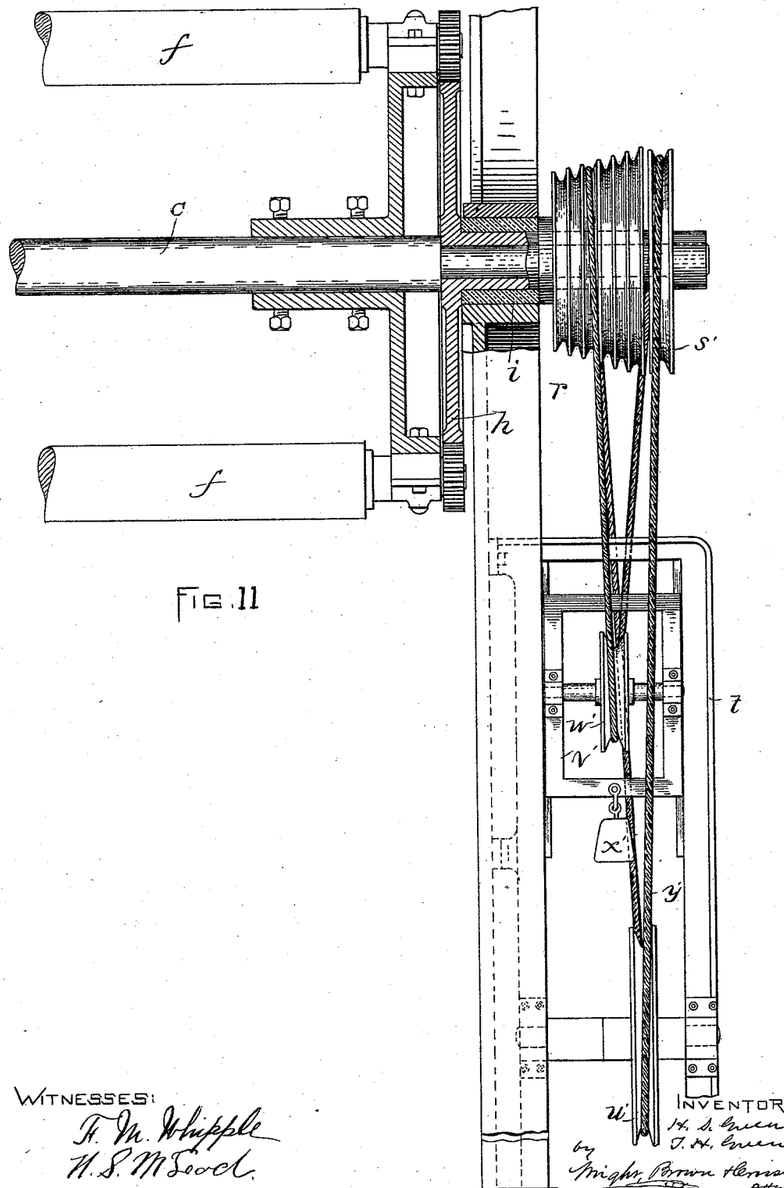
Fig. 11 is a sectional detail view showing a modified form of means for operating the napping rolls.

In Fig. 11 there is shown a "rope system," so called, for operating the cylinder from the main shaft, and this system may be employed instead of the gearing before described.

In the last-mentioned figure $r'$ designates a graduated groove pulley secured upon the sleeve $i$ of the gear $h$ and $s'$ is a grooved pulley secured upon the main shaft outside of the pulley $r'$. $t'$ is a bracket secured to the frame in the lower end of which bracket is journaled a groove pulley $u'$. $v'$ is a frame arranged to slide vertically on ways connected with the frame $t'$, in which sliding frame is journaled a grooved pulley $w'$. A weight $x'$ is attached to the sliding frame so as to draw the same downward and tighten the endless rope $y'$, which passes around in one of the grooves of the pulley $r'$, down around the pulley $u'$, up over the pulley $s'$, down around the pulley $w'$ and back again to the pulley $r'$. By this simple means it will be seen that the gear $h$ which operates the pinions on the napping rolls $f$ may be efficiently driven from the main shaft.

Figure 12:
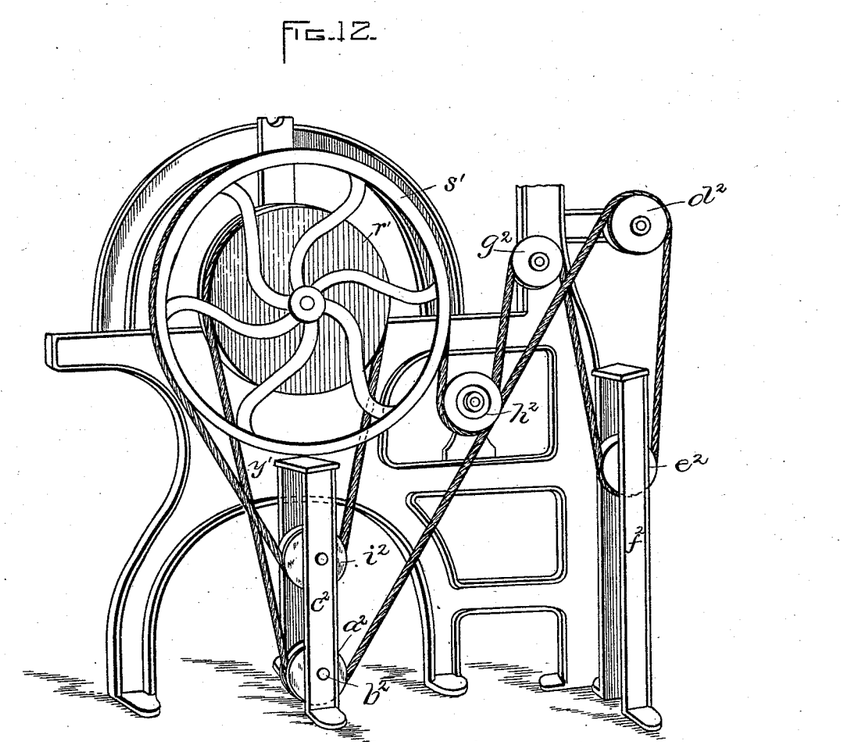
Figs. 12 and 13 show another modified form of means for operating the napping rolls.
Figure 13:
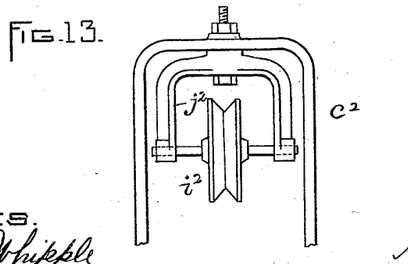

In Fig. 12, there is shown a slightly modified form of rope-driving mechanism. In this case the rope $y'$ passes from the graduated grooved pulley $r'$ down around a pulley $a^2$ loose and longitudinally movable upon a shaft $b^2$ supported in a frame $c^2$ secured to the floor. From the pulley $a^2$ the rope passes up over a pulley $d^2$ on a stud connected with the frame; thence down around a pulley $e^2$ supported in bearings in a frame $f^2$ similar to frame $c^2$; thence the rope may pass around pulleys $g^2$ $h^2$, around the pulley $s'$, down around a pulley $i^2$ in the frame $c^2$ and thence up around the pulley $r'$. Both the pulleys $e^2$ and $i^2$ may be loose upon their shafts so as to move longitudinally thereon, and both may be supported in a weighted vertically-movable frame as is the case with the pulley $w'$, shown in Fig. 11. Again, the pulley $w'$, $e^2$ and $i^2$ may be supported in a swiveled bracket $j^2$ as shown in Fig. 13.

Other modifications, it is obvious, may be made in the form and arrangements of parts comprising the invention without departing from the nature or spirit thereof.

Having now described the nature of the invention and explained a way of constructing and using it, though without attempting to set forth all of the forms in which it may be made or all of the modes of its employment, it is declared that what is claimed is—

1. A napping machine comprising in its construction a series of planetary napping rolls, a series of frictionally driven cloth moving rolls to move the cloth after it is acted upon by the napping rolls, the said cloth moving rolls being of increased diameter successively, means for adjusting the friction on said cloth moving rolls, and means for adjusting some of the cloth moving rolls toward and from the napping rolls.

2. A napping machine comprising in its construction a main shaft, a rotary cylinder carried by the shaft, a series of planetary napping rolls carried by the said cylinder operating means therefor, a rope-driving means intermediate of the said shaft and the napping rolls operating means, a series of cloth-moving rolls, and adjustable arches in which the said cloth-guiding rolls are supported, as set forth.

3. A napping machine comprising in its construction a rotary drum, rotary napping rolls carried by said drum, hinged adjustable arches in proximity to said drum, and cloth-guiding rollers and cloth-moving rolls carried by the said arches, as set forth.

4. A napping machine comprising in its construction napping devices, cloth-guiding rollers, a series of cloth-moving rollers, a pulley and gearing connected with each cloth-moving roll for operating the latter, a common belt engaged with all of the pulleys for operating the same, a belt-tightening pulley also engaged by the belt, and a lever supporting the said belt-tightening pulley and adapted to move the same to tighten and relax the belt, as set forth.

5. A napping machine comprising in its construction a series of planetary napping rolls, a series of cloth guiding rolls, and adjustably-movable arches in which the said cloth-guiding rolls are supported, as set forth.

6. A napping machine comprising in its construction a main shaft, a rotary cylinder carried by the said shaft, a series of rotary napping rolls carried by the said cylinder and means for operating them, and a rope driving means intermediate of the said shaft and the napping-rolls operating means, cloth-guiding rolls and simultaneously-adjustable supports for said cloth-guiding rolls.

7. A napping machine comprising in its construction a main shaft, a rotary cylinder carried by said shaft, rotary revoluble napping rolls carried by said cylinder, pinions connected with the said napping rolls, a gear loose on the main shaft and provided with a sleeve, a pulley on the said sleeve, a pulley on the main shaft, a pulley below the said sleeve and main shaft pulleys, a weighted pulley intermediate of the lower pulley and sleeve and main shaft pulleys, and a common rope or belt engaging and operating all of the said pulleys, as set forth.

8. A napping machine comprising in its construction a rotary drum, rotary napping rolls carried by said drum, hinged adjustable arches in proximity to said drum, cloth-guiding rolls and cloth-moving rolls carried by the said arches, and means for rotating the napping rolls on their own axes while revolving about the axis of the drum.

In testimony whereof we have signed our names to this specification, in the presence of two subscribing witnesses, this 12th day of September, A. D. 1892.

HENRY S. GREENE.
    THOMAS H. GREENE.

Witnesses:
 ARTHUR W. CROSSLEY,
 F. M. WHIPPLE.